United States Patent [19]

Lissmyr

[11] 4,192,376
[45] Mar. 11, 1980

[54] SHUTTING-OFF DEVICE

[76] Inventor: Per O. Lissmyr, Box 132, S-792 01 Mora, Sweden

[21] Appl. No.: 915,336

[22] Filed: Jun. 13, 1978

[30] Foreign Application Priority Data

Jun. 17, 1977 [SE] Sweden .................. 7707065

[51] Int. Cl.² ........................................... E21B 35/00
[52] U.S. Cl. ...................................... 166/53; 166/87; 166/95; 251/1 R
[58] Field of Search ................... 166/53, 75 R, 95, 96, 166/90, 87; 251/1 A, 1 B, 1 R

[56] References Cited

U.S. PATENT DOCUMENTS

| 1,455,731 | 5/1923 | Kelly | 251/1 R |
| 1,543,637 | 6/1925 | Woll | 166/96 |
| 1,899,922 | 3/1933 | Black | 251/1 R |
| 1,968,297 | 7/1934 | Hild | 251/1 R |
| 3,241,864 | 3/1966 | Shaffer | 166/85 |

Primary Examiner—James A. Leppink
Attorney, Agent, or Firm—Karl W. Flocks

[57] ABSTRACT

The present invention relates to a device adapted to be fitted on a pipe end as an emergency device for shutting off fluid flowing out through the pipe under pressure, and is especially intended for use in drilling or extraction plants for oil. This device comprises two interconnected units provided with a throughpassage and includes means for guiding the device into position over the effluent fluid jet to permit pulling the device onto the pipe end, a means which senses the device as it achieves engagement with the pipe end and is adapted to branch off fluid from the jet at this moment, and cylinder-piston means or the like adapted to be actuated by such branched-off pressure fluid and arranged to act, on one hand, on clamping means for retaining the device to the pipe end and, on the other hand, on valve means for closing the throughpassage.

8 Claims, 3 Drawing Figures

SHUTTING-OFF DEVICE

The present invention relates to a device to be fitted on a pipe end as an emergency device for shutting off fluid flowing out through the pipe under pressure, especially intended for use in drilling or extraction plants for oil.

In connection with drilling and extraction of oil the closure at the upper end of the pump or drill pipe must be removed occasionally, for instance when changing the drill-rod. Normally, a so-called blowout preventer, i.e. a valve means closing the pipe at same distance from the pipe end, is provided to prevent unchecked outflow of oil. As is well known, under extremely unfavourable conditions the valve means may be out of function without anybody noticing it and this may result in a disastrous outflow of oil and gas when the pipe end is opened. To prevent such unchecked outflow, a closing means is used which compresses the pipe so that the flow of oil can be checked while other valve means are being put into function. However, the prior art means are unwieldy and manual work is required to mount them on the pipe.

The object of this invention is to provide a device which normally is to be accessibly mounted in conjunction with the drill pipe and can be moved towards and secured to the pipe to automatically interrupt unchecked outflow without requiring any manual measures on the spot.

The essential characteristic of the device according to the invention is that the device, which suitably consists of two interconnected units provided with a throughpassage, comprises means for guiding the device into position of the effluent fluid jet to permit pulling the device onto the pipe end, a means which senses the device as it achieves engagement with the pipe end and is adapted to branch off fluid from the jet at this moment, and cylinder-piston means or the like adapted to be actuated by such branched-off pressure fluid and arranged to act, on one hand, on clamping means for retaining the device to the pipe end and, on the other hand, on valve means for closing the throughpassage.

An embodiment of the device according to this invention will be described in more detail hereinbelow with reference to the accompanying drawings, in which.

Figure 1:
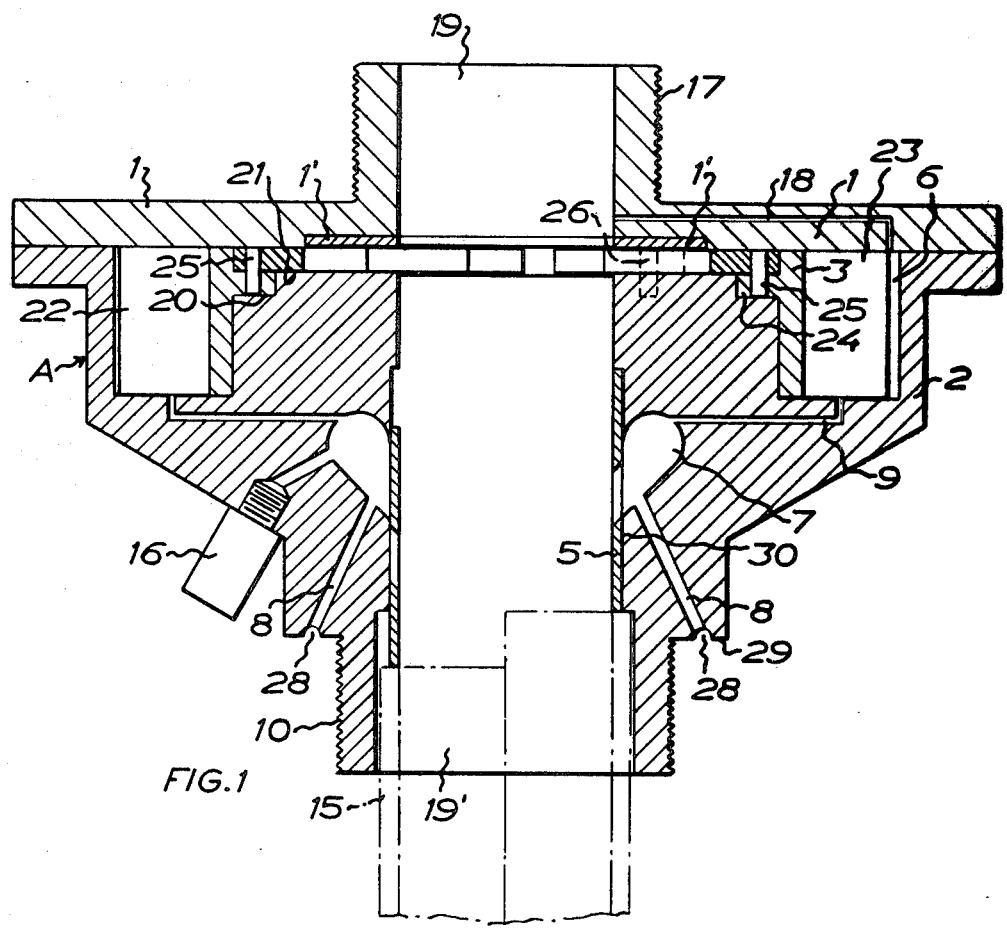
FIG. 1 is an axial cross-sectional view of the valve unit.
Figure 2:
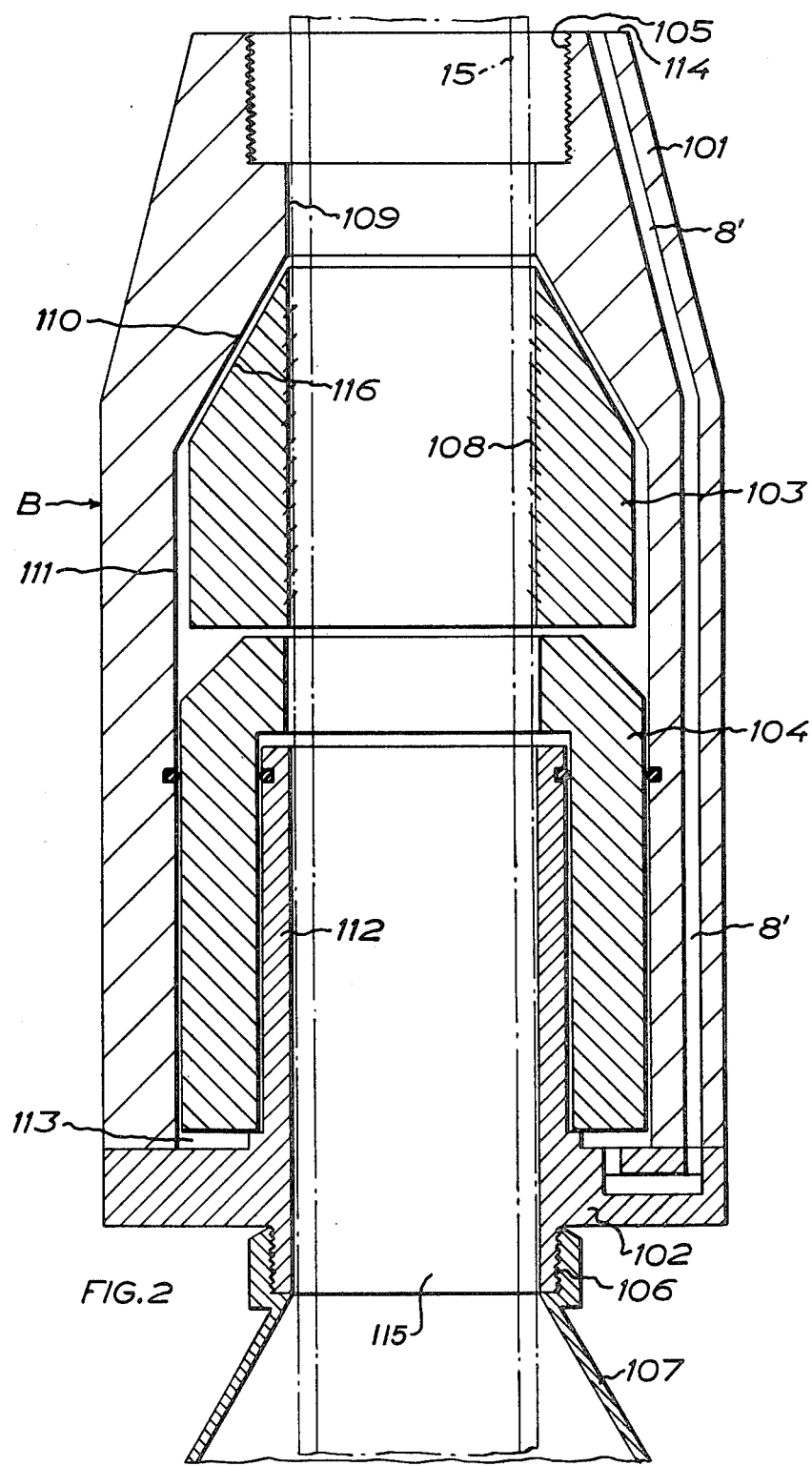
FIG. 2 is an axial cross-sectional view of the retaining unit.
Figure 3:
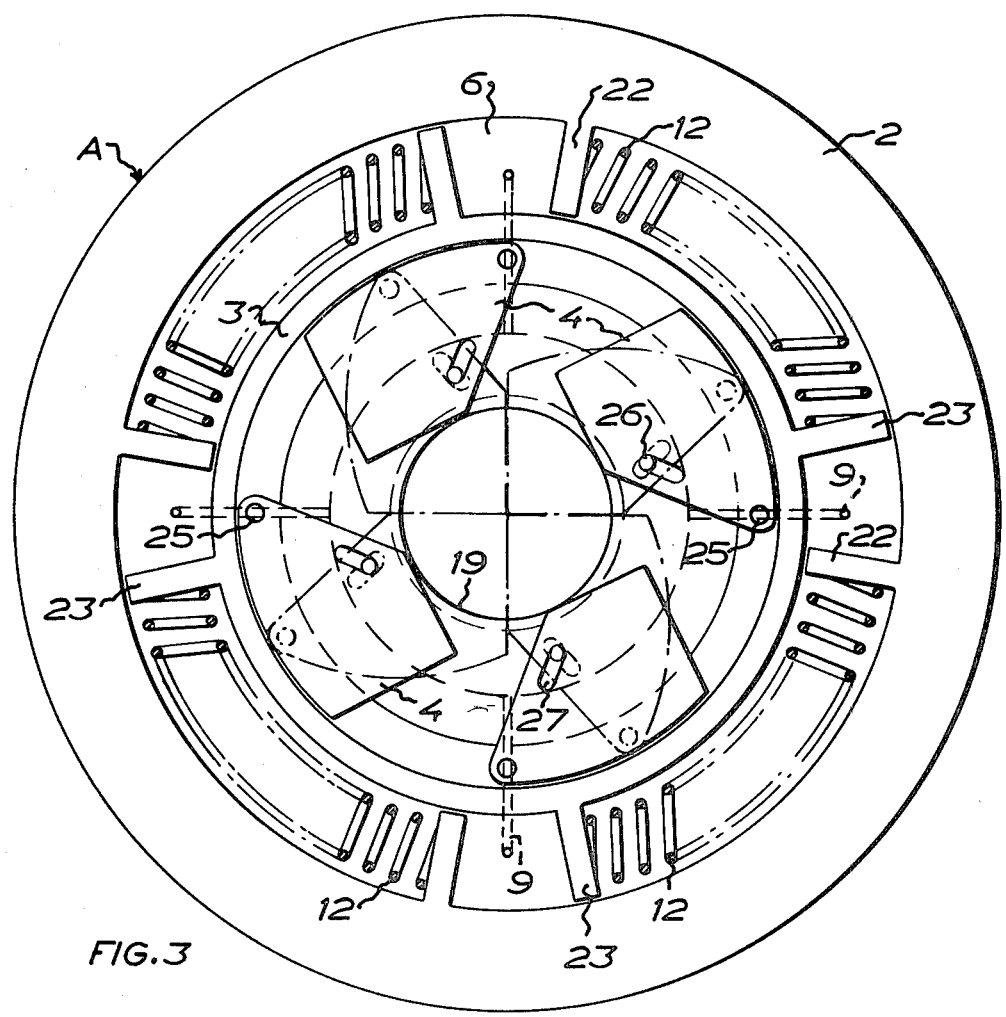
FIG. 3 is a top plan view of the valve unit with the cover removed.

The valve unit A comprises a housing 2 provided with a cover 1 which can be screwed onto it. The housing as well as the cover has a central opening 19 of a diameter substantially corresponding to the inner diameter of the pipe 15, indicated by broken lines, to which it should be possible to fit the device when needed. The lower portion 19' of the central opening is wider and has a diameter corresponding to the outer diameter of the pipe 15.

The housing 2 is provided with an annular recess or cylindrical chamber 6 which extends inwardly via a stepped groove 20 to form a planar slide face 21. From the outer wall of the recess extend in radially inward direction a number of stationary abutments or intermediate walls 22 the radial extent of which is less than the radial extent of the recess 6.

An annular element or cylinder ring 3 is rotatably arranged in the recess 6, close to the inner wall or, more exactly, between the inner wall and the inwardly extending intermediate walls 22. On its outside the annular element 3 is provided with vanes 23, serving as pistons, corresponding in number to the intermediate walls 22. Compression springs 12 are arranged between each of these vanes 23 and the intermediate walls 22.

Fixed on the inside of the annular element 3 is a flange 24 which is fitted in the stepped groove 20 and supports pivot pins 25.

Closing discs 4 are arranged in the space between the cover 1, which is provided with seals 1', and the slide face 21. The discs are connected with the flange 24 of the annular element 3 via the pivot pins 25 and are guided by means of guide pins 26 fixed in the material of the housing and running in elongated slots 27 in the discs 4.

Arranged in the housing 2, around the central opening 19, is an annular chamber 7 which opens towards the central opening 19 and communicates via passages 9 with the cylinder chamber 6 and communicates via passages 8 with an annular groove 28 adjacent an end surface 29 positioned adjacent a connector piece provided with an external thread 10.

Arranged in a depressed portion 30 of the central opening 19 of the housing is a slidable sleeve 5 with openings which in an outer position screens off the annular chamber 7 from the central opening 19 but, in an inwardly displaced position, opens said chamber towards the central opening.

The length of the sliding sleeve 5 and the depressed portion is adjusted so that in inwardly displaced position the lower edge of the sleeve will be flush with the transition, serving as an abutment for the pipe 15, between the wide portion 19' and the relatively narrow portion 19 of the central opening.

The retaining unit B consists of a sleeve-shaped body 101 which at its upper end has an internally threaded recess 105 intended to receive the connector piece with the thread 10 of the valve unit A. This recess passes into a circular opening 109 having a diameter corresponding to the diameter of the wide portion 19' of the opening of valve unit A, i.e. to the outer diameter of the pipe 15. The inside of the sleeve-shaped body includes adjacent said opening 109 a conical wall portion 110 which passes into an axial wall portion 111.

A collar 112 entering the opening of the sleeve is fitted at a cover 102 in the bottom end of the body 101 so that an annular chamber 113, which is closed at the bottom, is formed between the outside of said collar and the axial wall portion 111.

A passage 8' extends from the chamber 113 through the cover 102 and the sleeve wall up to the top end surface 114 where it opens in such a way that it will be exactly opposite the annular groove 28 at the end face 29, when the units A and B have been screwed together. The chamber 113 will thus communicate with the annular chamber 7 of the valve unit A via the passage 8', the groove 28 and the passage 8.

The collar defines inwardly an opening 115 having the same diameter as the opening 109.

A funnel 107 is connected to the mouth of the opening 115, at the underside of the cover 102 and, as will be described below, this funnel is intended to facilitate guiding of the device into position over the pipe 15 and the oil jet flowing out through the pipe.

The space 113 between the collar 112 and the wall 111 forms a chamber for an annular piston means 104 which is adapted to move in upward direction when oil under pressure enters the space 113.

Arranged over the piston means 104 is a number of clamping jaws 103 which at their upper part are formed with inwardly inclined surfaces 116 complementary to the wall portion 110 and which, in inactive position, are brought to bear against the axial wall portion 111 with the aid of means not shown. When the piston means 104 is moved upwardly these jaws are displaced as well upwardly as inwardly so as to engage the surface of the pipe 15 and thus retain the device to said pipe.

To ensure safe retention the jaws 103 are provided with grooves or cutting rings 108 which cut themselves into the surface of the pipe.

The device of this invention is intended to be used and to function as follows.

On drill platforms, extraction pipes and the like, where unchecked outflow can occur there should be provided a remote- or radio-controlled crane and this should carry the assembly A+B according to the invention. When the outflow begins the operators should be evacuated from the platform and the device may be moved inwardly towards the pipe from which the oil flows out. By means of the funnel 107 the device can be guided into position over the oil jet so that the oil jet will pass freely through the central opening. The device is then lowered so that the pipe 15 is introduced through the funnel 107, the collar 112, the opening 109 of the unit B and reaches the lower portion 19' of the central opening of the unit A where the pipe end meets the slidable sleeve 5. The slidable sleeve, which so far has been in its lower or outer position, thus preventing oil from passing into the chamber 7, is now displaced downwardly so as to uncover the chamber 7. Oil, which is branched off from the jet into the chamber, passes through the passages 8 and 8' into the chamber 113 where it actuates the piston means 104 to move upwardly and thus displace the jaws 103 into a position where they engage the pipe 15. At the same time an amount of oil—which is smaller because the area of passage 9 is smaller than the area of the passages 8 and 8'—passes through said passage 9 into the annular chamber 6 of the unit A where it begins to turn, against the action of the springs 12, the annular element 3 which itself turns the closing discs 4 into the central opening 19 so as to throttle the oil outflow. Once the outflow is throttled, the build-up of pressure in the chamber 7, the passage 8—8' and the chamber 113 will increase, whereby the annular piston 104 will be pressed upwardly with increased force and the piston will cause the jaws 103 to engage and cut into the pipe 15 with increasing force.

When closing discs have completely closed the passage through the central opening of the device and the oil outflow has been interrupted, a conventional valve may be fitted on the threaded portion 17 at the top.

To permit opening of the closing means, overflow passages 18 are arranged in the cover 1, said passages extending from the central opening 19, beyond the closing discs 4, to those portions of the cylinder chamber 6 where the springs 12 are arranged, i.e. that side of the vanes of the annular element 3 which is opposite that side upon which the oil acts after it has entered through the chamber 7 and the passage 9. When the total force of the springs and the overflow oil having leaked past the discs 4 exceeds the force of the oil pressure, which tends to keep the discs 4 in closing position, the discs will turn aside so that the passage through the device will be open again and the outflow of oil can be checked by the mounted additional valve.

The difference in throughflow area of the passages (8—8' and 9 and the pressure difference obtained by the spring force being added to the pressure force of the overflow oil have as a result that the retention of the clamping jaws will not be influenced during the operation described above.

To prevent displacement of expulsion of the device due to gas explosions or other sudden increases of pressure during or after the closing operation, the annular chamber is provided with a number of safety or overflow valves 16 adapted to let out oil and gas momentaneously if the pressure in the chamber should be so high as to cause damages.

The invention should not be considered restricted to that which is described above and shown in the drawings but it may modified in various ways within the scope of the appended claims.

What I claim and desire to be secured by Letters Patent is:

1. A device adapted to be fitted on a pipe end as an emergency device for shutting off fluid flowing out through the pipe under pressure, especially intended for use in drilling or extraction plants for oil, said device comprising two interconnected units provided with a throughpassage, including means on one end of said interconnected units for guiding the device into position over the effluent fluid jet to permit pulling the device onto the pipe end, a means in one of said interconnected units which senses the device as it achieves engagement with the pipe end and is adapted to branch off fluid from the jet at that moment, clamping means in one of said interconnected units for retaining the device to the pipe end, valve means in one of said interconnected units for closing the throughpassage, and cylinder-piston means actuated by branched-off pressure fluid of said sensing means to act on said clamping means and said valve means.

2. A device as claimed in claim 1, wherein said means sensing the device as it attains the position of engagement with the pipe end is a slidable sleeve arranged in the throughpassage and provided with an aperture, said sleeve preventing branching-off of fluid from the jet in unactuated position but permitting, in actuated position, branching-off and inflow of fluid to the cylinder-piston means of said device.

3. A device as claimed in claim 1 wherein said cylinder-piston means includes a first cylinder piston, and said clamping means includes jaws which are adapted to be pressed with wedge action against the surface of the pipe by means of said first cylinder-piston, the surface configuration of said jaws being such as to increase friction.

4. A device as claimed in claim 3, wherein said cylinder-piston means includes a second cylinder piston, and said valve means includes discs which are adapted to be displaced, preferably in the radial plane, into the throughpassage by means of said second cylinder-piston.

5. A device as claimed in claim 3, wherein said first cylinder piston is annular in shape, and said cylinder-piston means comprises an annular cylinder chamber in which said annular piston is movable in parallel with the direction of the throughpassage for the pipe.

6. A device as claimed in claim 4, wherein said cylinder-piston means with said second cylinder piston acting upon said valve means includes an annular cylinder chamber, intermediate walls dividing said annular cylinder chamber into several sections, spring means, and an annular element which is provided with vanes, serving as pistons, and which is adapted to rotate around the throughpassage of the device against the action of said spring means, the rotation of said element causing said valve means to move in the radial plane.

7. A device as claimed in claim 6, wherein overflow passaged are arranged to permit withdrawal of said valve means from a position closing the throughpassages opening when another closing means has been placed beyond the device, as seen in the flow direction, by such equalization of the pressure on either side of said vanes, serving as pistons, that the force of said spring means with withdraw said valve means from closing position.

8. A device as claimed in claim 1, wherein safety or overflow valves are arranged in the communication between the throughpassage and said cylinder-piston means.

* * * * *